United States Patent [19]

Mori

[11] 4,336,981
[45] Jun. 29, 1982

[54] SIMULTANEOUS MULTI-BEAM OPTICAL MODULATION SYSTEM

[75] Inventor: Masaaki Mori, Kawasaki, Japan

[73] Assignee: Ricoh Co., Ltd., Japan

[21] Appl. No.: 172,148

[22] Filed: Jul. 25, 1980

Related U.S. Application Data

[62] Division of Ser. No. 954,533, Oct. 25, 1978, Pat. No. 4,269,482.

[30] Foreign Application Priority Data

Oct. 25, 1977 [JP] Japan .................... 52-127857

[51] Int. Cl.³ ............................... H04B 9/00
[52] U.S. Cl. ................................. 350/358
[58] Field of Search ......................... 350/358

[56] References Cited

U.S. PATENT DOCUMENTS

| 3,727,062 | 4/1973 | Foster | 350/358 |
| 3,744,039 | 7/1973 | Hrbek et al. | 350/358 |
| 3,935,566 | 1/1976 | Snopko | 350/358 |

Primary Examiner—William L. Sikes
Attorney, Agent, or Firm—McGlew and Tuttle

[57] ABSTRACT

The simultaneous multi-beam optical modulation system comprises the steps of producing a dummy signal in such a manner that the sum of a plurality of signals and the dummy signal is kept constant, modulating the amplitudes of assigned carriers by the dummy signal and the plurality of the signals so as to produce a modulated output and applying the modulated output to an acoustic optical element.

7 Claims, 6 Drawing Figures

SIMULTANEOUS MULTI-BEAM OPTICAL MODULATION SYSTEM

This is a division of application Ser. No. 954,533, filed Oct. 25, 1978 and now U.S. Pat. No. 4,269,482.

BACKGROUND OF THE INVENTION

The present invention relates to a simultaneous multi-beam light modulation system, which can be employed in a laser printing apparatus.

In a well-known simultaneous multi-beam light modulation system, a plurality of image signals are assigned to carriers, respectively and the amplitude of each carrier is modulated, whereby a plurality of modulated signals are produced, and at the same time, by the modulated signals, an acoustic optical element is actuated, so that a laser beam is divided and modulated by the acoustic optical element. This system is employed in a laser printing apparatus and is practical for use in lowering the deflection speed of a scanning optical deflection apparatus. However, in this system, since the acoustic optical element is actuated simultaneously by a plurality of modulated signals, the light modulation intensity by each image signal is changed under the influence of other image signals, so that cross modulation occurs between the multiple beams from the acoustic optical element.

Under the circumstances, a system as shown in FIG. 1 is proposed for the purpose of obviating such cross modulation. In this system, a plurality of image signals from a signal source 1 respectively modulate the amplitude of the carriers assigned to the respective image signals, from high-frequency oscillators 5 to 7 in AM modulators 2 to 4. The polarities of the respective image signals from the signal source 1 are inverted in inverters 8 to 10 and summed up by an adder 11. The output signals from the adder 11 modulates the amplitude of an assigned carrier from a high-frequency oscillator 13 in an AM modulator 12. The output signals from the AM modulators 2 to 4 and 12 are mixed by a mixer 14 and are then amplified by an amplifier 15 so that the amplified signal is applied to an acoustic optical element 16. The acoustic optical element 16 diffracts a laser beam 17 by Bragg diffraction and produces diffracted lights of first order 18 to 21 corresponding to the output signals from the AM modulators 2 to 4 and 12, and a light of zero order 22. Of the multiple diffracted light beams 18 to 21, the light beam 21 which corresponds to an output signal of the AM modulator 12 is cut out by a light cut plate 23, so that only the light beam 18 to 20 corresponding to the image signals are taken out.

In this system, the output signals modulated by the image signals and the output signals modulated by the image signals whose polarities are inversed are applied to the acoustic optical element 16. Therefore, the light modulation intensity by each image signals becomes constant, without being influenced by other image signals, so that cross modulation between the respective beams less occurs. However, since the respective polarities of a plurality of image signals from the signal source 1 are first inversed by the inverters 8 to 10 and are then added by the adder 11, the necessary electric circuits become complicated. Furthermore, there exist as many image signals as the corresponding multiple beams 18 to 20, and the dynamic range of each beam is equal, but the AM modulators 2 to 4, the amplifier 15 and the acoustic optical element 16 have their own frequency bands which are not flat, and the respective beams more or less influence each other. Therefore, the characteristics of image signal: light output are not always identical.

SUMMARY OF THE INVENTION

For the foregoing reason, a principal object of the present invention is to provide a simultaneous multi-beam light modulation system capable of removing cross modulation of beams and correcting the characteristics of image signal: light output, so that the above-mentioned shortcomings of the conventional simultaneous multi-beam light modulation system are eliminated.

According to the present invention, a dummy signal is produced in such a manner that the sum of a plurality of signals and the dummy signal is constant, and the amplitude of carriers assigned to the signals and the dummy signal are respectively modulated by the signals and the dummy signal, so that a modulated output produced by the above-mentioned procedure is applied to an acoustic optical element. Therefore, cross modulation of beams is minimized. Furthermore, since the dummy signal is produced by addition and inversion of a plurality of signals and a setting signal, the dummy signal can be produced by one circuit. Therefore, an electric circuit necessary for producing the dummy signal is very simple. Furthermore, the gain of each modulated output can be controlled by a gain control means so that the input and output characteristics can be controlled with respect to each beam.

BRIEF DESCRIPTION OF THE DRAWINGS

For a better understanding of the invention as well as the object and other features, reference will be had to the following detailed descsription which is to be read in conjunction with the drawings wherein.

DETAILED DESCRIPTION OF THE PREFERRED EMBODIMENTS

Figure 2:
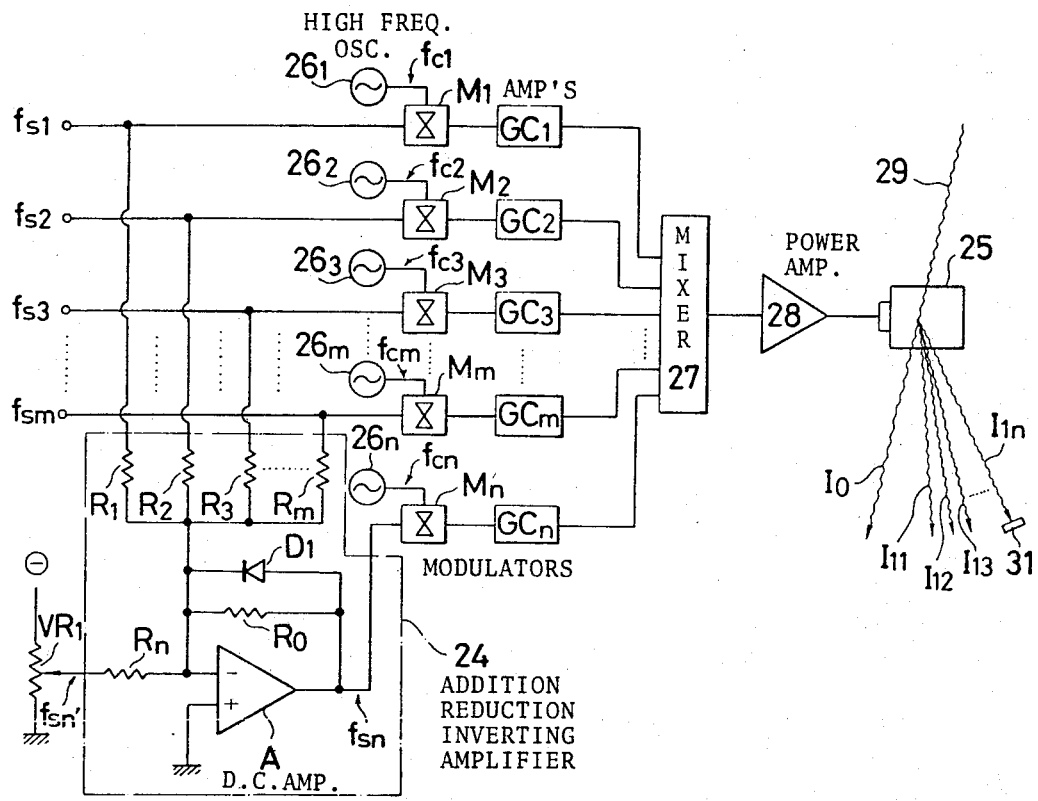
FIG. 2 is a block diagram of an embodiment of a simultaneous multi-beam light modulation system according to the present invention.

Minimizing cross modulation between beams in the simultaneous multi-beam light modulation system can be attained by use of an acoustic optical element having a broad frequency band with intensity of the overall deflection of light of first order kept constant, irrespective of input of image signals, and when an employed frequency band is broad, since the characteristics of image signal input: deflection of light of first order do not differ so much in each beam, a system capable of reducing cross modulation can be conceivable by keeping the sum of the input of image signals constant. In an embodiment of a simultaneous multi-beam light modulation system according to the present invention, a design is such that the sum of output beams $I_{11}$ to $I_{1m}$ and a dummy beam $I_{1n}$, namely $\Sigma I_1 = I_{11} + I_{12} + \ldots I_{1m} + I_{1n}$ is kept constant. In order to accomplish this, a dummy signal voltage $f_{sn}$ is produced in such a manner as to make the sum of image signal input voltages $f_{s1}$ to $f_{sm}$ and dummy signal voltage $f_{sn}$, namely $\Sigma f_{s3} = f_{s1} + f_{s2} + f_{sm} \ldots + f_{sn}$, constant. To be more specific, referring to FIG. 2, an addition-reduction inverting amplifier 24 comprising resistors $R_0$ to $R_n$ (where $R_0 = R_1 = R_2 = R_3 = \ldots R_n$), a diode $D_1$ and a direct current amplifier A performs addition of the image signal input voltages $f_{s1}$ to $f_{sm}$ and reduction of a setting voltage $f_{sn}'$ and inverse amplification of the image signal input voltages $f_{s1}$ to $f_{sm}$ and the setting voltage $f_{sn}'$. The setting voltage $f_{sn}'$ is a voltage for setting the overall deflection efficiency of an acoustic optical element 25 and is produced by dividing a power source whose polarity is opposite to that of the image signal input voltages $f_{s1}$ to $f_{sm}$ by use of a resistor $VR_1$. In other words, the addition-reduction inverting amplifier 24 produces the dummy signal $f_{sn}$ by addition of the image signal input voltages $f_{s1}$ to $f_{sm}$ and the setting voltage $-f_{sn}'$, followed by inversion thereof, namely $f_{sn} = -\{(f_{s1} + f_{s2} + \ldots + f_{sm}) - f_{sn}'\}$.

Figure 3:
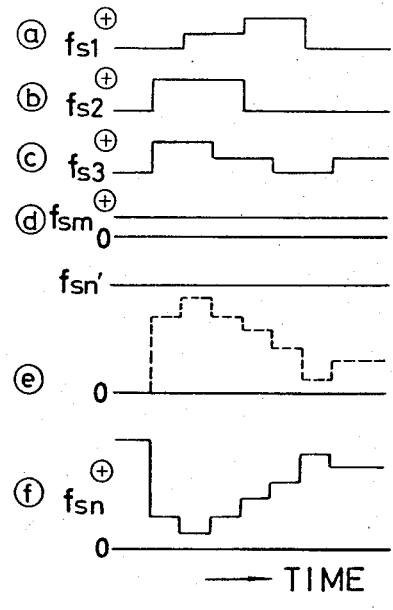
FIG. 3 is a timing chart of the embodiment according to the present invention.

Referring to FIG. 3 (a) to (d), there are shown the image signal input voltages $f_{s1}$ to $f_{sm}$. In FIG. 3 (e), the dot lines indicate $f_{s1} + f_{s2} + \ldots + f_{sm}$, and the solid line indicates $f_{sn}'$. FIG. 3 (f) shows the dummy signal $f_{sn}$. Thus, in the present invention, addition of the image signal input voltages $f_{si}$ to $f_{sm}$ and the setting voltage $-f_{sn}'$ and their inversion can be performed by one element 24. Furthermore, even if the number of beams or the number of image signals increases, such addition or inversion can be performed by increasing only the number of the resistors $R_1$ to $R_m$. Therefore, the necessary circuits do not become complicated. The diode $D_1$ constitutes a protective circuit for prohibiting generation of a negative output.

By modulators $M_1$ to $M_m$ and $M_n$, the thus produced dummy signal $f_{sn}$ and the image signals $f_{s1}$ and $f_{s2}$ modulates the amplitude of the carriers $f_{c1}$ to $f_{cm}$ and $f_{en}$, which are respectively assigned by high-frequency oscillators $26_1$ to $26_m$ and $26_n$. The output signals of the modulators $M_1$ to $M_n$ are summed up into one signal by a mixer respectively through gain control amplifiers $GC_1$ to $GC_n$. The summed signal is amplified by a power amplifier 28 and is then applied to an acoustic optical element 25. The acoustic optical element 25 divides and modulates a laser beam 29 from a laser generating apparatus and produces deflected light beams of first order $I_{11}$ to $I_{1m}$ and $I_{1n}$ which respectively correspond to the image signals $f_{s1}$ to $f_{sm}$ and the dummy signal $f_{sn}$, and a light beam of zero under $I_0$. Of the deflected light beams of first order $I_{11}$ to $I_{1n}$, the deflected light beam $I_{1n}$ corresponding to the dummy signal $f_{sn}$ is unnecessary. Thus, it is cut out by a light cutting plate 31.

Figure 1:
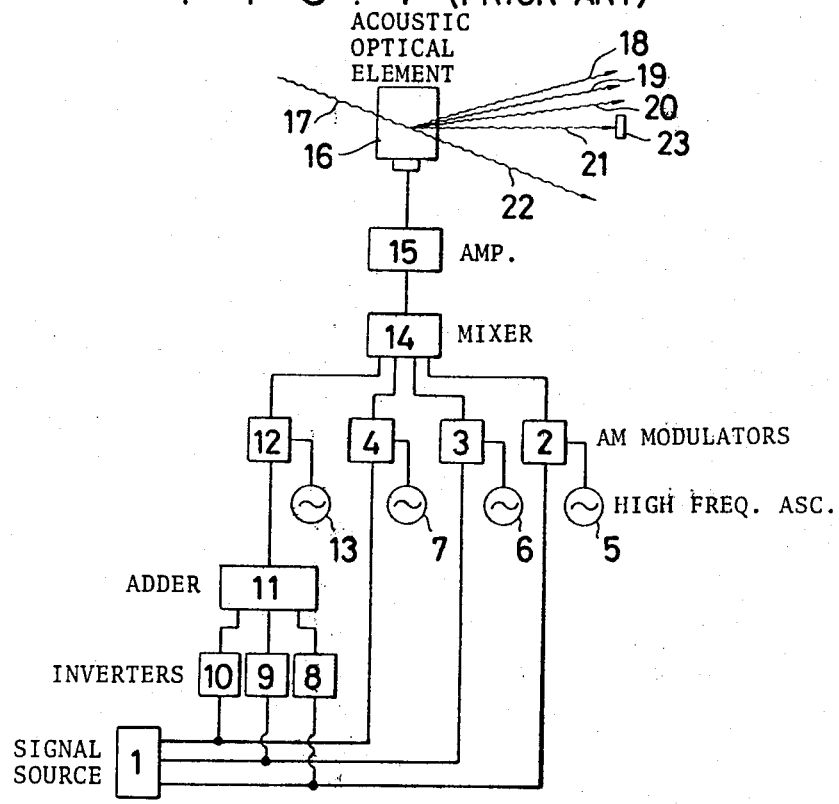
FIG. 1 is a blcok diagram of a conventional simultaneous multi-beam light modulation system.
Figure 4:
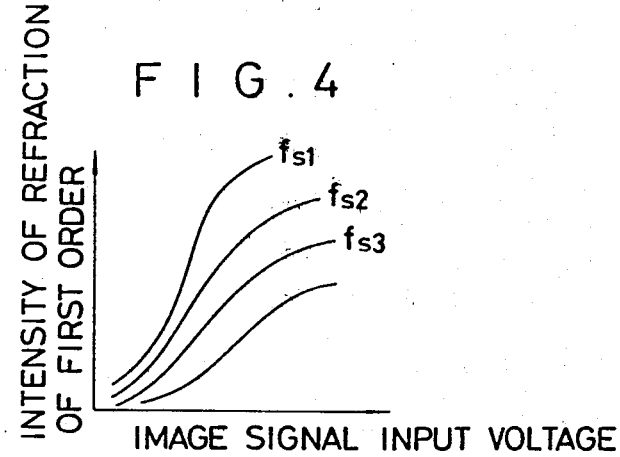
FIG. 4 is a graph showing the characteristics of image signal input voltage: intensity of refraction of first order.
Figure 5:
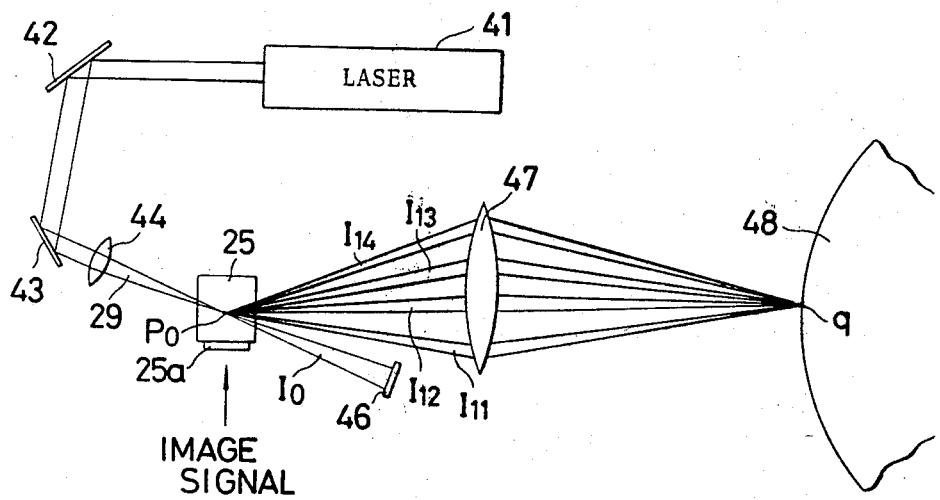
FIG. 5 shows schematically an example of multi-beam simultaneous scanning apparatus that can be employed in conjunction with the simultaneous multi-beam light modulation system according to the present invention.

When the dynamic ranges of the image signals $f_{s1}$ to $f_{sm}$ are made equal, the characteristics of image signal: first order deflected light or intensity of refraction of first order are scattered as shown in FIG. 4 with respect to each beam by the employed electric circuits, the frequency band of the acoustic optical element 25 and cross modulation between the beams. Since the scattering of the characteristics of image signal: first order deflected light is caused by the difference of the gain or the gradient of the input and output characteristics, the gain control amplifiers $GC_1$ to $GC_n$ are adjusted so that the input and output characteristics of the respective beams are in agreement. By such adjustment, the first order deflected lights $I_{11}$ to $I_{1n}$ having an equal intensity are obtained from the image signals $f_{sl}$ to $f_{sm}$ having an equal intensity. As a resistor $VR_1$ for setting the overall first order deflected light in FIG. 2, a variable resistor is employed so that the overall first order deflected light can be changed in accordance with the dynamic range of each image signal when the dynamic range is changed. When the first order deflected lights $I_{11}$ to $I_{1n}$ are recorded on a photoconductive material for the purpose of reading by a computer output apparatus, a facsimile apparatus or a copying apparatus, a multi-beam simultaneous scanning apparatus as shown in FIG. 5 can be employed. In FIG. 5, the laser beam 29 from a laser source 41 is focussed by a focussing lens system 44 and is injected into the acoustic optical element 25 which is located in a focussing point of the laser beam 29. In the figure, reference numerals 42 and 43 indicate plane reflectors. A plurality of image signals, namely four image signals in FIG. 5, are applied to a transducer 25a of the acoustic optical element 25.

Supposing that high-frequency carriers for the respective image signals are, for instance, $\cos 2\pi f_1 t$, $\cos 2\pi f_2 t$, $\cos 2\pi f_3 t$, $\cos 2\pi f_4 t$ and that information signals for performing amplitude modulation of these high-frequency carriers are $a_1(t)$, $a_2(t)$, $a_3(t)$, and $a_4(t)$, the image signals are applied to the transducer 25a in the form of $$\sum_{i=1}^{4} a_i(t) \cos 2\pi f_i t.$$

Then, the first order deflected light beams $I_{11}$, $I_{12}$, $I_{13}$, $I_{14}$ come out in the respective directions in accordance with the respective frequencies $f_1$ to $f_4$. These first order deflected lights $I_{1i}$ (i=1 to 4) are modulated in their intensities by their corresponding information signals $a_i(t)$ (i=1 to 4).

The zero order light beam $I_0$ which comes out of the acoustic optical element 25 is cut out by a stopper 46.

The first order deflected light beams $I_{11}$ to $I_{14}$ enter a focussing lens system 47 and are focussed near a point q on a photoconductive recording material 48. In practice, a deflecting means such as a galvanormittor, is placed between the acoustic optical element 25 and the recording material 48, so that the abovementioned deflected light beams $I_{1i}$ (i=1 to 4) are deflected for scanning the recording material 48 in the direction normal to FIG. 5.

Figure 6:
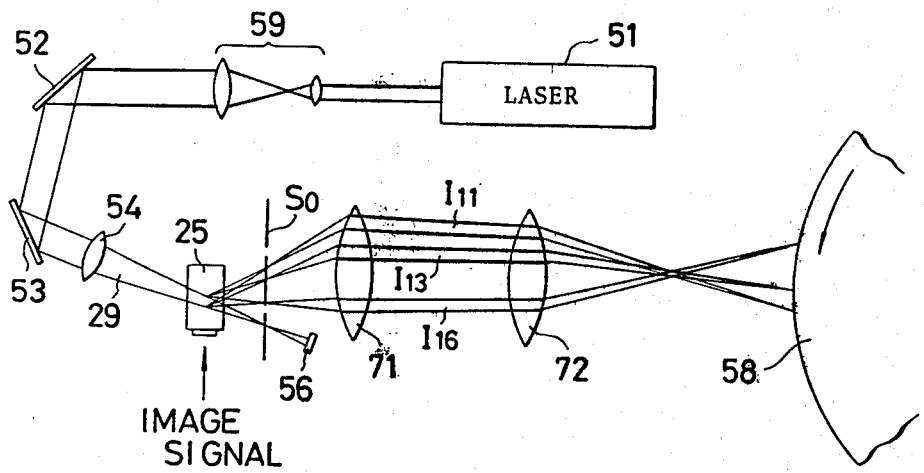
FIG. 6 shows schematically another example of multi-beam simultaneous scanning apparatus that can be employed in conjuction with the simultaneous multi-beam light modulation system according to the present invention.

Referring to FIG. 6, there is shown another example of multi-beam simultaneous scanning apparatus for use with the present invention. In the figure, reference numeral indicates a laser source and reference numerals 52 and 53 indicate plane reflectors. Reference numeral 54 indicates a focussing lens system and reference numeral 25 indicates an acoustic optical element. The abovementioned members are substantially identical with those in the apparatus shown in FIG. 5.

The multi-beam simultaneous scanning apparatus in FIG. 6 is for writing six lines by a simultaneous scanning. As the laser source 5, He-Ne laser is employed, and as a crystal for use in the acoustic optical element 25, $PbM_oO_4$ is employed. As the focussing lens system 54, a focussing lens system with a 120 mm focal length is employed. High-frequency carriers with frequencies $f_1=150$ MHz, $f_2=167$ MHz, $f_3=184$ MHz, $f_4=201$ MHz, $f_5=218$ MHz, and $f_6=235$ MHz are employed. Six first order deflected light beams $I_{11}, I_{12}, \ldots I_{16}$ come out of the acoustic optical element 25 which is positioned, 80 mm apart from the focussing lens system 54, on the optical axis of the focussing lens system 54, and are focussed on a plane $S_0$ with a 60 μm space therebetween. For simplification, only the deflected light beams $I_{11}, I_{13}$ and $I_{16}$ are shown in FIG. 6.

Reference numeral 59 indicates a beam expander. The diameter of the laser beam from the laser source 51 is enlarged by the beam expander 59 and is then caused to enter the focussing lens system 54.

Reference numeral 71 indicates a lens system, and reference numeral 72 indicates a $f-\theta$ lens system. These two lens systems 71 and 72 constitute another focussing lens system.

As a deflecting means, a rotary multi-mirror device (not shown) is placed between the lens system 71 and $f-\theta$ lens system.

In order that the first order deflected light beams $I_{1i}$ (i=1 to 6) are focussed, with a 83 μm space therebetween, on a recording material 58, by the focussing lens system comprising the lens system 71 and the $f-\theta$ lens system 72, the synthesizing magnification ratio in the focussing lens system has to be 1.33.

In the case where the lens system 71 with a 184 focal length and the $f-\theta$ lens system 72 with a 245.8 mm focal length and with a 33 mm distance between its lens surface and its second principal point are employed, in order to satisfy the above-mentioned condition, the object focal plane of the lens system 71 is caused to coincide with the surface $S_0$ and the distance between the lens system 71 and the image side principal point of the $f-\theta$ lens system 72 is set at 200 mm and the position of the recording material is determined in such a manner that the scanning surface of the recording material 58 is caused to coincide with the image side focal plane of the $f-\theta$ lens system 72.

The rotary multi-mirror as the deflecting means is positioned in such a manner that its beam deflection center comes to a position apart from the object side lens surface of the $f-\theta$ lens system by 30 mm.

The recording material 58 is a photoconductive drum. The surface of the photoconductive drum is charged uniformly and the scanning of six lines is performed simultaneously on the charged surface in the direction normal to FIG. 6 under the rotation of the photoconductive drum in the direction of the arrow, whereby a latent electrostatic image corresponding to an image signal is formed on the surface of the photoconductive drum.

The thus formed latent image is visualized by toner. The visible toner image is transferred and then fixed to a recording sheet, whereby a recording image corresponding to the image signal can be obtained.

By adjusting the beam diameter magnification of the beam expander 59, fine adjustment of the spot diameter of the focal point of the beam can be performed. Furthermore, by adjusting the frequency of carrier applied to the acoustic optical element or by moving minutely the position of the $f-\theta$ lens system along its optical axis, fine adjustment of the line space for writing-out scanning can be performed.

What is claimed is:

1. In a simultaneous multi-beam optical modulation system having a signal source for producing a plurality of image signals, a plurality of amplitude modulators connected to the signal source each for modulating one of the image signals, a high-frequency carrier oscillator connected to each of the modulators for producing a carrier to modulate each image signal, and an acoustic optical element for deflecting light connected to each of the amplitude modulators for producing a plurality of output light beams each corresponding to one of the image signals, the improvement comprising, addition-reduction inverting means connected to the signal source for receiving each of the image signals, setting voltage means connected to said addition-reduction inverting means for supplying a setting voltage which is of opposite polarity to the image signals, the signal voltage being applied to said addition-reduction inverting means, said setting voltage being provided for setting an overall deflection efficiency of the acoustic optical element, means in said addition-reduction inverting means for adding said setting voltage to the image signals to produce a sum and inverting said sum to produce a dummy signal, an assigned amplitude modulator connected to said addition-reduction inverting means for receiving said dummy signal, a high-frequency carrier connected to said assigned amplitude modulator for modulating said dummy signal and gain control means connected between each of said amplitude modulators and the acoustic optical element for adjustably amplifying each of said modulated image signals to equalize the intensity of the output light beams produced by the acoustic optical element.

2. The improvement of claim 1, wherein said addition-reduction inverting means comprises a plurality of resistors each connected on one side thereof to one of said image signals and on the other side thereof in common, a D.C. amplifier connected to said common connection of said resistors and to said voltage setting means for producing said dummy signal.

3. The improvement of claim 2, wherein said voltage setting means comprises a variable resistor connected to a negative potential.

4. The improvement of claim 1, wherein said gain control means comprises a plurality of gain control amplifiers each being variable and each connected to one of said amplitude modulators, a mixer connected to each of said gain control amplifiers, and a power amplifier connected between said mixer and the acoustic optical element.

5. The improvement of claim 1, further including a laser source for producing a laser beam, focusing means disposed between said laser source and the acoustic optical element for focusing the laser beam onto the acoustic optical element, said signal source comprising a light transducer connected to the acoustic optical amplifier for dividing the laser beam into a plurality of the output light beams and a zero-order light beam, a stopper facing said acoustic optical element for blocking said zero-order light beam, a light sensitive member spaced from the acoustical optical element and a focusing lens disposed between said photo-sensitive surface and the acoustic optical element for focusing said output light beams onto said photo-sensitive surface.

6. The improvement of claim 5 wherein said focusing lens comprises a lens system (71) and a f9 lens system (72) spaced from said lens system.

7. In a simultaneous multi-beam optical modulation system, a process comprising producing a plurality of image signals, modulating each of said image signals with a carrier to produce a modulated image signal, providing a setting voltage of polarity opposite to that of the image signal, adding each of the image signals to each other and to the setting voltage for producing a sum, inverting the sum to produce a dummy signal, modulating the dummy signal with an assigned carrier to produce a modulated dummy signal, mixing each of said modulated image signals and modulated dummy signal to each other to produce a combined signal, providing an acoustic optical element for receiving the combined signal and producing a plurality of output light beams corresponding to said image signals and said dummy signal, and adjustably amplifying each of said modulated image signals to render the intensity of each of said corresponding light beams equal.

* * * * *